US008482180B2

(12) United States Patent
Seki et al.

(10) Patent No.: US 8,482,180 B2
(45) Date of Patent: Jul. 9, 2013

(54) STATOR, BRUSHLESS MOTOR, AND MANUFACTURING METHOD OF THE SAME

(75) Inventors: Akihiko Seki, Toyokawa (JP); Tetsuji Yoshikawa, Hamamatsu (JP); Masato Kamimura, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 40 days.

(21) Appl. No.: 13/226,648

(22) Filed: Sep. 7, 2011

(65) Prior Publication Data

US 2012/0098381 A1   Apr. 26, 2012

(30) Foreign Application Priority Data

Oct. 20, 2010   (JP) .................................. 2010-235744

(51) Int. Cl.
*H02K 3/38*   (2006.01)

(52) U.S. Cl.
USPC .......................................... 310/215; 310/179

(58) Field of Classification Search
USPC .................. 310/214, 215, 216.009, 216.008, 310/216.012, 216.015, 216.019, 216.074, 310/216.109, 216.113, 216.115, 254.1, 179
See application file for complete search history.

(56) References Cited

U.S. PATENT DOCUMENTS

| | | | | |
|---|---|---|---|---|
| 6,741,004 | B2 * | 5/2004 | Senoo et al. | 310/215 |
| 7,498,709 | B2 * | 3/2009 | Shteynberg et al. | 310/184 |
| 7,649,296 | B2 * | 1/2010 | Fukasaku et al. | 310/215 |
| 7,732,969 | B2 * | 6/2010 | Ishizeki et al. | 310/194 |
| 2004/0183388 | A1 * | 9/2004 | Rittmeyer | 310/179 |

FOREIGN PATENT DOCUMENTS

JP    09322441 A   * 12/1997

OTHER PUBLICATIONS

US english JPO translation of JP 09322441 A, Dec. 1997, Inaba, Yutaka.*

* cited by examiner

*Primary Examiner* — Tran Nguyen
*Assistant Examiner* — Naishadh Desai
(74) *Attorney, Agent, or Firm* — Posz Law Group, PLC

(57) ABSTRACT

An inner rotor type brushless motor includes a stator. The stator is made of a plurality of stator sections. Each one of the stator sections has a plurality of core members, an insulator, and a winding wound on the core members via the insulator. The core member includes a yoke portion and a tooth portion. The insulator includes a ring portion to connect the core members. Since each stator section can provide sufficient distance and space between two core members on the same stator section, it is easy to wind the winding on the tooth portions. The stator sections can be assembled along an axial direction to form the stator. The yoke portions are circumferentially arranged to connect each other to form a magnetic path.

11 Claims, 8 Drawing Sheets

STATOR, BRUSHLESS MOTOR, AND MANUFACTURING METHOD OF THE SAME

CROSS REFERENCE TO RELATED APPLICATION

This application is based on Japanese Patent Application No. 2010-235744 filed on Oct. 20, 2010, the contents of which are incorporated herein by reference in its entirety.

FIELD OF THE INVENTION

The present invention relates to a stator for a rotary electric machine, a brushless motor, and a manufacturing method of the stator and the brushless motor.

BACKGROUND OF THE INVENTION

JPH09-322441A discloses a stator for a brushless motor. According to the above document, an armature includes a core member that is made of a plurality of ring shaped yoke members that can be separated in an axial direction. Each one of the yoke members has an integrally formed with a tooth portion protruding toward radial outside.

However, the brushless motor disclosed in the above document is an outer rotor type motor. The document discloses nothing about an inner rotor type motor, such as a stator, a brushless motor and manufacturing method for the same. If the yoke disclosed in the above document is modified to fit the inner rotor type motor, the tooth portions have to be arranged to protrude toward radial inside. In the above case, it is hard to wind coils on the tooth portions, especially from a radial outside. It is also difficult to use a flyer winding machine, since the arrangement of the above mentioned core requires to wind a coil from a radial inside. In the above case, it may be still possible to use a nozzle winding machine which can wind a coil on the tooth portion from a radial inside. In a case of using the nozzle winding machine, it is necessary to keep space which allows to move and to pass the nozzle between the tooth portions. In addition, the space lowers the space factor of the coil that is a ratio of a conductive material in a cross section of the coil. As a result, it is difficult to increase the space factor and it makes it difficult to make the rotary electric machine small. In addition, since the nozzle winding machine is slower in a winding speed compare to the flyer winding machine, it is difficult to increase a winding speed of the coil. Additionally, since it is difficult to reduce the number of winding machine, it is difficult to lower cost of products.

In the above discussion, the flyer winding machine includes a flyer and a variable former. The flyer winding machine performs a flyer winding method in which the coil is wound on the tooth portion by feeding the coil from the flyer while driving the flyer to rotate around the tooth portion along a circular path, and, simultaneously, by forming and shaping the coil by using the variable former. The nozzle winding machine includes a nozzle. The nozzle winding machine performs a nozzle winding method in which the coil is wound on the tooth portion by feeding the coil from the nozzle while alternately repeating a rotational driving process for driving the nozzle to move around the tooth portion and a axial sliding process for driving the nozzle to move along the axial direction in a sliding manner.

SUMMARY OF THE INVENTION

It is an object of the present invention to provide a stator for an inner rotor type brushless motor that is capable of being manufactured easily. It is an object of the present invention to provide a stator for an inner rotor type brushless motor that has core members with low magnetic loss and coil portions capable of being manufactured easily.

It is another object of the present invention to provide a stator for an inner rotor type brushless motor that is capable of being small and low cost.

An embodiment of the invention provides a stator for a rotary electric machine, which comprises a core, windings, and insulators. The core has a ring shaped yoke and a plurality of tooth portions protruding inwardly from the yoke. The core includes a plurality of core members. Each of the core members including a yoke portion which provides a part of the yoke, and the tooth portion integrally formed with the yoke portion. The plurality of windings have a plurality of coil portions wound on the tooth portions. The windings provide a plurality of phase windings. The plurality of insulators are provided for phases of the rotary electric machine respectively. Each of the insulators have a plurality of insulator portions disposed between the tooth portions and the coil portions, and a connecting portion which connects the insulator portions for the same phase.

The stator may be manufactured by the following method, for example. In one of the steps, a plurality of subassemblies for phases may be formed by assembling or integrally forming the core portions and the insulator portions. In one of the following step, a plurality of stator sections are formed for the phases by winding the winding on the tooth portions placed on the subassembly from a radial outside of the subassembly by using a winding machine. Then, the stator is formed by assembling the stator sections.

According to the stator, the yoke is formed by a plurality of yoke portions which are provided by dividing the yoke along a circumferential direction. Therefore, even if the stator is the one that is used for the inner rotor type brushless motor in which the plurality of tooth portions protrude inwardly from the yoke, it is possible to wind the windings on the tooth portions from the radial outside of the tooth portions by using a winding machine. As a result, it is possible to increase the space factor of the winding. In other words, it is possible to make the stator 10 small.

The yoke is divided into the plurality of yoke portions along the circumferential direction. Therefore, it is possible to make the stator small in the axial direction compare to a case in which the yoke is divided along the axial direction.

According to the arrangement of the subassembly, it is possible to use a flyer winding machine that is faster in winding speed compare to a nozzle winding machine. In a case of using the flyer winding machine, it is possible to make a winding step faster, and it is possible to manufacture the stator in low cost by decreasing the number of winding machines.

The connecting portion and the insulator portions in one of the phases may be formed to hold the tooth portions in an outwardly protruding manner with respect to the connecting portion. Each of the connecting portions may be formed in a ring shape. The connecting portions may be arranged on the same axis of the yoke.

Each of the windings may further include a plurality of jumper portions which connect the plurality of coil portions and are arranged on the ring portions on the same phase. In this case, the ring portions may be coaxially arranged with each other, and the ring portions other than the ring portion arranged most inside have recess portions.

The recess may avoid interference between portions of the stator sections. For example, the jumper portions may be arranged to pass through the recess portions formed on the ring portions arranged outside thereof. The recess portions may avoid interference between the ring portions and the jumper portions. It is possible to reduce length of the jumper portions. Thereby, it is possible to make the stator smaller, and to manufacture the stator in lower cost.

Each of the windings may further include a plurality of jumper portions which connect the plurality of coil portions and are arranged on the ring portions on the same phase. In this case, each of the ring portions may include a holder portion which holds the jumper portion arranged on the ring portion.

Therefore, when forming the stator by assembling the plurality of stator sections, it is possible to hold the jumper portions on the ring portions by the holder portions. Therefore, it is possible to improve workability at the time of assembling the plurality of stator sections. In addition, after assembling the stator into a brushless motor, the jumper portions are held on the ring portions by the holder portions. Therefore, it is possible to prevent the jumper portions from moving freely, and to reduce noise and malfunctions.

The ring portions may be coaxially arranged with each other. In this case, at least one of the ring portions may include a spacer portion which is disposed between radially adjacent ring portions and keeps the ring portions in a radially distanced manner.

The plurality of ring portions can be held in a radially separated manner by the spacer portion which may be formed as a protruded portion. Thereby, it is possible to form and provide spaces for arranging the jumper portions between the ring portions, and to prevent the ring portions from vibrating. In addition, it is possible to improve workability at the time of assembling the ring portions compare to a case where the ring portions are fitted each other over entire circumferential length.

The stator may be used as a stator in a brushless motor. In this case, the brushless motor includes the stator, and a rotor rotatable by a rotating magnetic field generated by the stator.

It is possible to make the brushless motor small and in low cost.

The stator may be manufactured by a method comprising the following steps. The method comprises a step of forming subassemblies for the phases by assembling or integrally forming the core members and the insulator portions. The method comprises a step of forming stator sections for the phases by winding the winding on the tooth portions placed on the subassembly from a radial outside of the subassembly by using a winding machine. The method comprises a step of forming the stator by assembling the stator sections.

It is possible to increase the space factor of the windings in a space between the tooth portions, and to make the stator small.

According to the arrangement of the subassembly, it is possible to use a flyer winding machine that is faster in winding speed compare to the nozzle winding machine. In a case of using the flyer winding machine, it is possible to make the winding step faster, and it is possible to manufacture the stator in low cost by decreasing the number of winding machines.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Figure 1:
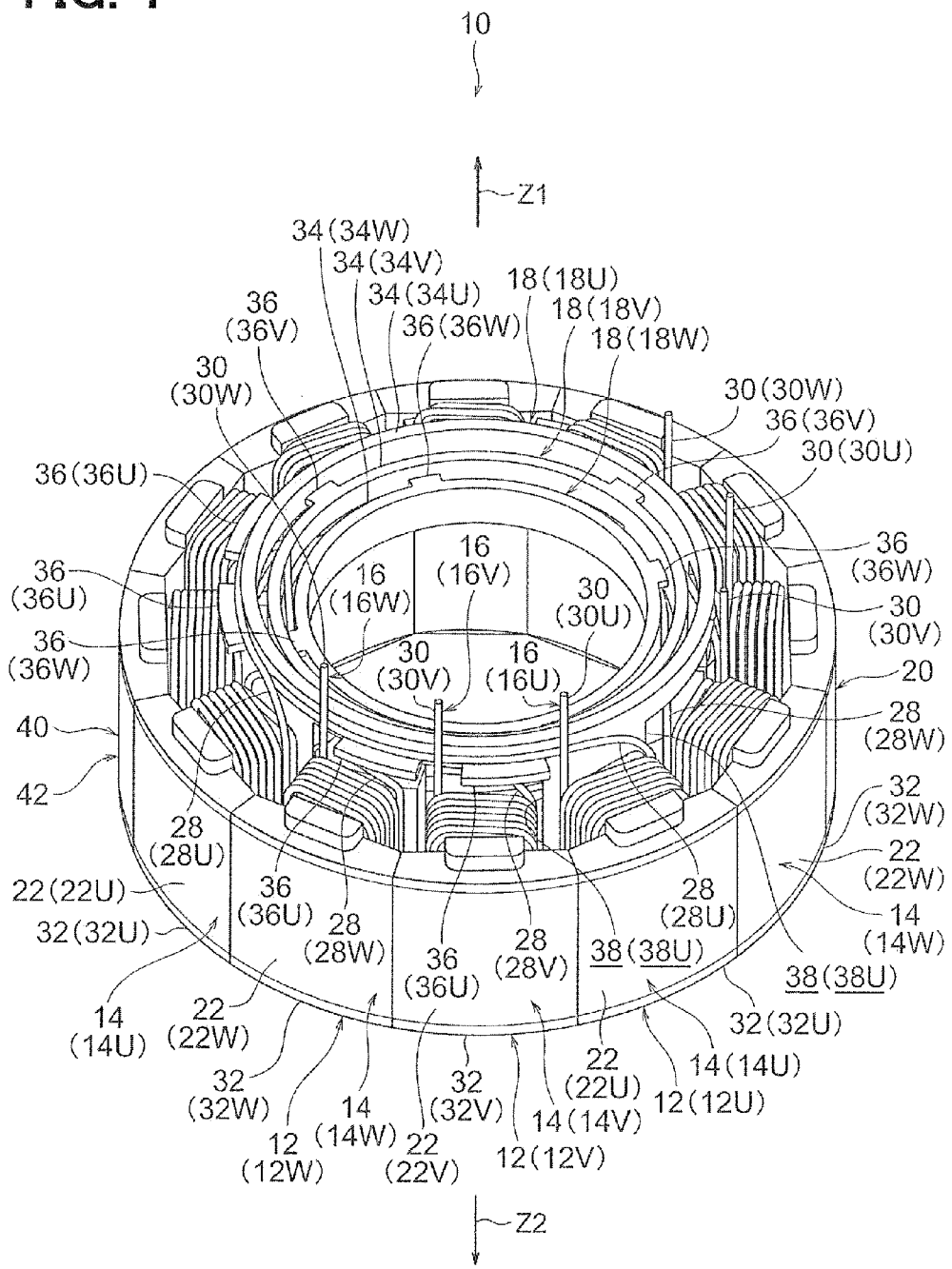
FIG. 1 is a perspective view of a stator according to a first embodiment of the present invention.

Hereinafter, embodiments of the present invention are described referring to the drawings.

Figure 2A:
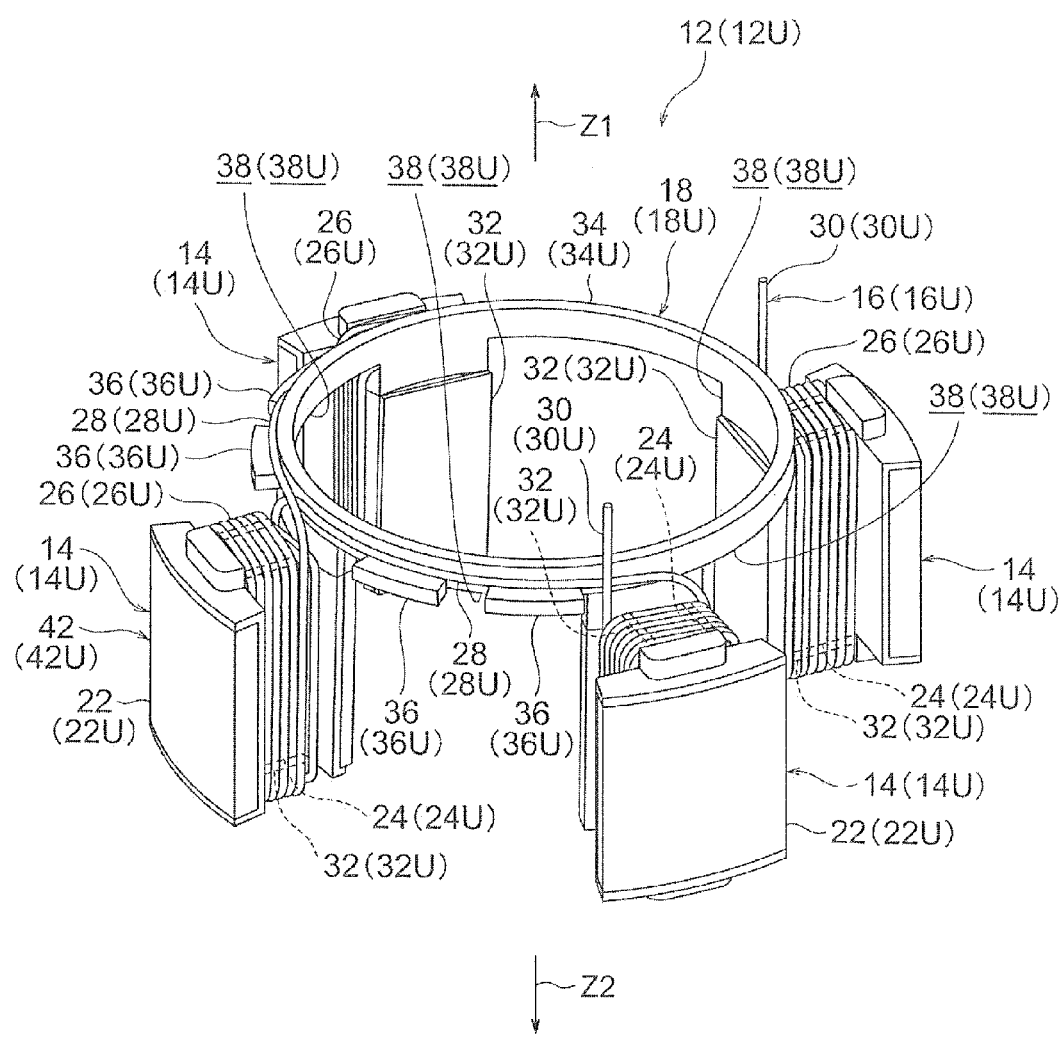
FIG. 2A is a perspective view of a U-phase-stator section shown in FIG. 1.
Figure 2B:
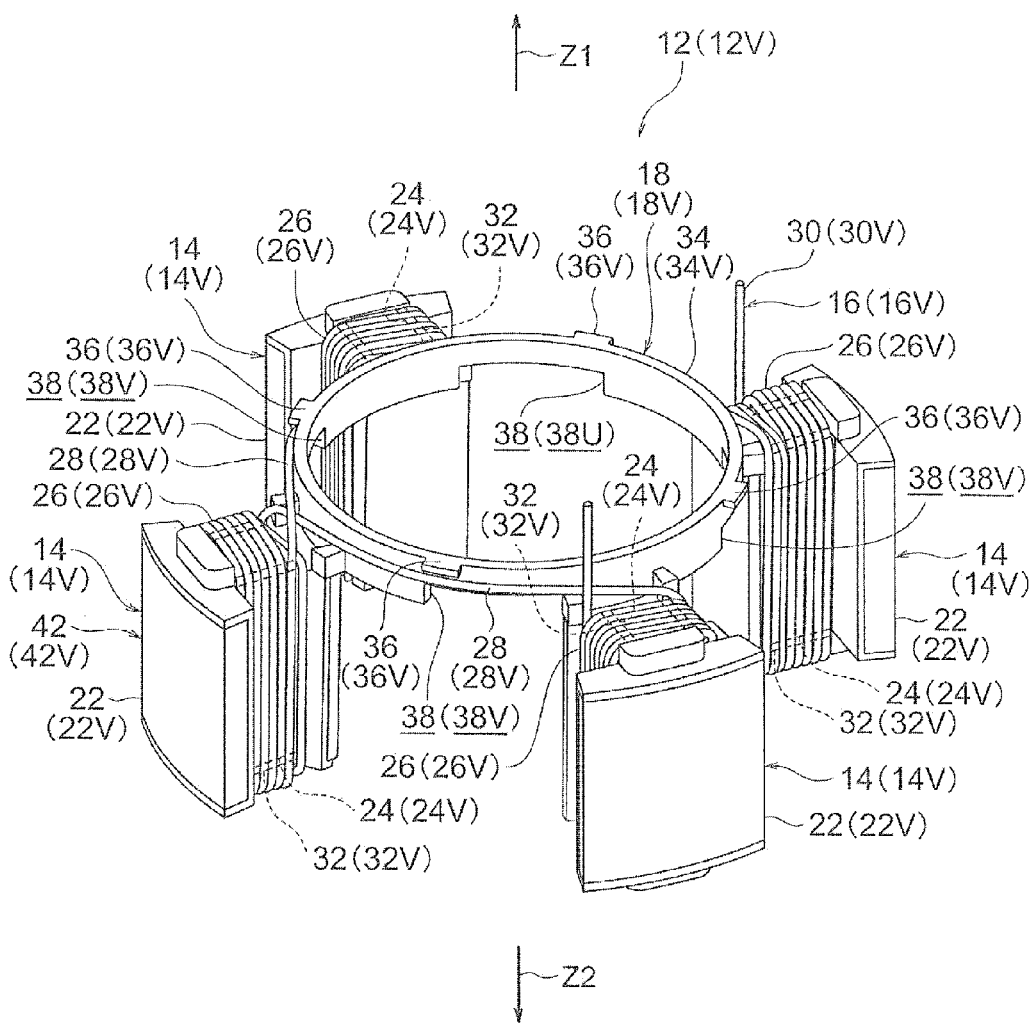
FIG. 2B is a perspective view of a V-phase-stator section shown in FIG. 1.
Figure 2C:
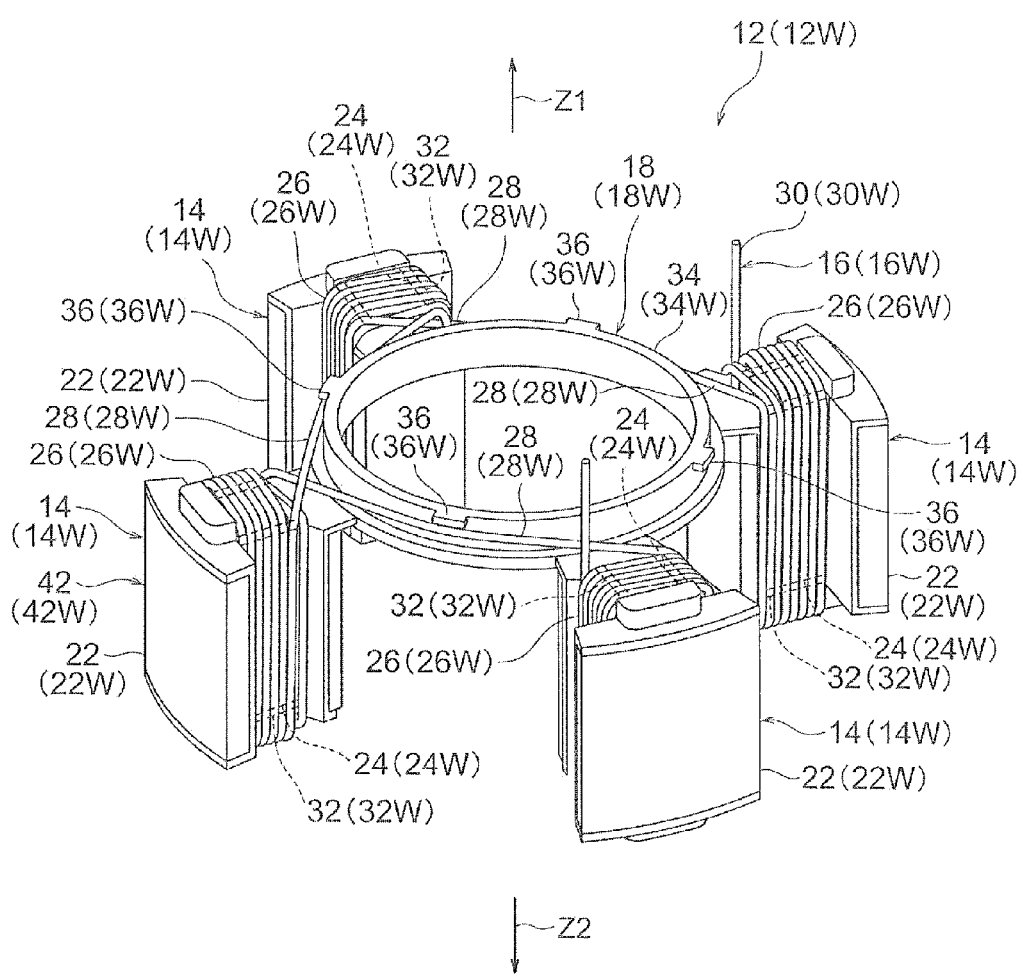
FIG. 2C is a perspective view of a W-phase-stator section shown in FIG. 1.

FIG. 1 shows a stator 10 according to a first embodiment of the present invention. The stator 10 is a stator for a rotary electric machine such as an inner rotor type brushless motor. The stator 10 comprises a core 20 having a ring shaped yoke 40 and a plurality of tooth portions 24 protruding inwardly from the yoke 40. The core 20 includes a plurality of core members 14. Each of the core members 14 includes a yoke portion 22 and the tooth portion 24. The yoke portion 22 provides a part of the yoke 40. The tooth portion 24 is integrally formed with the yoke portion 22. The stator 10 includes a plurality of windings 16. Each of the windings 16 includes a plurality of coil portions 26 wound on the tooth portions 24. The windings 16 provide a plurality of phase windings 16U, 16V, and 16W. The stator 10 includes a plurality of insulators 18 provided for phases of the rotary electric machine respectively. Since the stator 10 has three phases, the stator 10 includes three insulators 18U, 18V, and 18W. Each of the insulators 18 has a plurality of insulator portions 32 and a connecting portions 34. The insulator portion 32 is disposed between the tooth portion 24 and the coil portion 26, and may be referred to as an insulator bobbin. The connecting portion 34 connects the insulator portions 32 for the same phase. Since the connecting portions 34 are formed in a ring shape, the connecting portions 34 may be referred to as ring portions 34. The connecting portion 34 and the insulator portions 32 in one of the phases may be formed to hold the tooth portions 24 in an outwardly protruding manner with respect to the connecting portion 34. The stator 10 includes a U-phase-stator section 12U, a V-phase-stator section 12V, and a W-phase-stator section 12W. FIGS. 2A, 2B, and 2C show the U-phase-stator section 12U, the V-phase-stator section 12V, and the W-phase-stator section 12W, respectively.

As shown in FIG. 2A, the U-phase-stator section 12U includes a plurality of core members 14U, a winding 16U, and an insulator 18U. Each one of the core members 14U includes a yoke portion 22U and a tooth portion 24U. As a result, the U-phase-stator section 12U includes a plurality of yoke portions 22U and a plurality of tooth portions 24U. As shown in FIG. 1, the plurality of core members 14U form a core 20 shown in FIG. 1 together with a plurality of core members 14V for a V phase and a plurality of core members 14W for a W phase described later. The core 20 is a magnetic core to provide a magnetic path. The plurality of core members 14U are arranged along a circle to define gaps between circumferentially adjacent two core members 14U. Each one of the gaps provides predetermined distance that is capable of accommodating two other core members 14V and 14W.

The yoke portion 22U is formed in an arc shape. The yoke portion 22U may be formed in a shape that corresponds to a sectional part of a cylindrical shape. As shown in FIG. 1, the plurality of yoke portions 22U form a yoke 40 shown in FIG. 1 together with a plurality of yoke portions 22V for a V phase and a plurality of yoke portions 22W for a W phase described later. The yoke 40 is formed in a ring shape. The tooth portion 24U is integrally formed with corresponding yoke portion 22U. As shown in FIG. 1, the tooth portion 24U protrudes inwardly from the yoke 40.

The winding 16U provides a U phase of the brushless motor. The winding 16U includes a plurality of coil portions 26U and a plurality of jumper portions 28U. Each one of the coil portions 26U is wound on corresponding one of the tooth portions 24U in a concentrated manner. The coil portion 26U is wound on the tooth portion 24U via an insulator portion 32U described later. The plurality of coil portions 26U are electrically connected each other by the plurality of jumper portions 28U. The plurality of coil portions 26U are connected in series. The jumper portion 28U is disposed along an outer circumferential surface of a ring portion 34U formed on the insulator 18U described in detail later. The jumper portion 28U is arranged on the ring portion 34U in a winding manner. Terminal portions 30U on both ends of the winding 16U are arranged on the U-phase-stator section 12U to be protruded in one axial direction of the stator 10 from the tooth portions 24U. The terminal portions 30U protrude in a direction shown by an arrow Z1.

The insulator 18U is made of a resin. The insulator 18U includes the insulator portions 32U and the ring portion 34U. The plurality of insulator portions 32U and the ring portion 34U are integrally formed in a continuous shape. The insulator portions 32U protrude in a radial outside direction with respect to the ring portion 34U, respectively. The insulator portions 32U are formed the same number as the tooth portions 24U. The plurality of insulator portions 32U are integrally disposed on the core members 14U, respectively, in an integral forming manner or an assembling and fitting manner. The insulator portion 32U electrically insulates between the core member 14U, e.g., the tooth portion 24U and the coil portion 26U. In other words, each one of the tooth portions 24U is covered with corresponding one of the insulator portions 32U in order to insulate the tooth portions 24U from the winding 16U.

The ring portion 34U connects the plurality of insulator portions 32U. The ring portion 34U is disposed on one axial side end of the plurality of insulator portions 32U. The ring portion 34U is disposed on the side end in the direction shown by the arrow Z1. The ring portion 34U further includes a plurality of holder portions 36U. The holder portion 36U is located on a part of the ring portion 34U extending between the insulator portions 32U. The holder portions 36U outwardly protrudes from a radial outside surface of the ring portion 34U in a radial outside direction. The holder portions 36U support the jumper portions 28U from the other axial side end of the ring portion 34U. The holder portions 36U are located next to the jumper portions 28U on a side where an arrow Z2 is illustrated. The ring portion 34U further has a plurality of recess portions 38U formed on a part of the ring portion 34U extending between the insulator portions 32U. The recess portions 38U are formed to open toward the other axial side end of the ring portion 34U. In other words, the recess portions 38 are formed to open toward the direction shown by the arrow Z2.

The V-phase-stator section 12V shown by FIG. 2B has basically the same structure as the U-phase-stator section 12U described above. That is, as shown in FIG. 2B, the V-phase-stator section 12V includes a plurality of core members 14V, a winding 16V, and an insulator 18V. Each one of the core members 14V includes a yoke portion 22V and a tooth portion 24V. As a result, the V-phase-stator section 12V includes a plurality of yoke portions 22V and a plurality of tooth portions 24V. The plurality of yoke portions 22V, the plurality of tooth portions 24V, the winding 16V, and the insulator 18V correspond to and have similar arrangements to the plurality of yoke portions 22U, the plurality of tooth portions 24U, the winding 16U, and the insulator 18U. The ring portion 34V of the V-phase-stator section 12V has a diameter that is smaller than that of the ring portion 34U of the U-phase-stator section 12U. The ring portion 34V has the recess portions 38V. The holder portions 36V support the jumper portions 28V from the one axial side end of the ring portion 34U. The holder portions 36V are located next to the jumper portions 28V on a side where the arrow Z1 is illustrated.

The W-phase-stator section 12W shown by FIG. 2C has basically the same structure as the U-phase-stator section 12U described above. That is, as shown in FIG. 2C, the W-phase-stator section 12W includes a plurality of core members 14W, a winding 16W, and an insulator 18W. Each one of the core members 14W includes a yoke portion 22W and a tooth portion 24W. As a result, the W-phase-stator section 12W includes a plurality of yoke portions 22W and a plurality of tooth portions 24W. The plurality of yoke portions 22W, the plurality of tooth portions 24W, the winding 16W, and the insulator 18W correspond to and have similar arrangements to the plurality of yoke portions 22U, the plurality of tooth portions 24U, the winding 16U, and the insulator 18U. The ring portion 34W of the W-phase-stator section 12W has a diameter that is smaller than that of the ring portion 34V of the V-phase-stator section 12V. The ring portion 34W does not have any recess portion corresponding to the recess portions 38U and 38V. As a result, the ring portions other than the ring portion arranged most inside have recess portions, but the ring portion arranged most inside does not have any recess portion. The holder portions 36W support the jumper portions 28W from the one axial side end of the ring portion 34W. The holder portions 36W are located next to the jumper portions 28W on a side where the arrow Z1 is illustrated.

Referring to FIG. 1 again, the plurality of stator sections 12U, 12V, and 12W are assembled as described later, and provide the stator 10. In the stator 10, the yoke 40 is formed by the plurality of yoke portions 22U, 22V, and 22W. In other words, the yoke 40 is divided in the plurality of yoke portions 22U, 22V, and 22W with respect to a circumferential direction. The plurality of yoke portions 22U, 22V, and 22W are arranged in a circumferential direction in a predetermined order and come in contact with each other to permit magnetic flux flow. Each one of the plurality of yoke portions 22U, 22V, and 22W is fitted between a pair of the other yoke portions located on both circumferential sides thereof.

The stator 10 includes the plurality of ring portions 34U, 34V, and 34W. The plurality of ring portions 34U, 34V, and 34W are coaxially arranged with each other at a radial inside of the yoke 40, and are arranged on an axis of the yoke 40. The ring portion 34V is arranged on a radial inside of the ring portion 34U to overlap each other in a radial direction. The ring portion 34W is arranged on a radial inside of the ring portion 34V to overlap each other in a radial direction. As a result, the ring portion 34W is arranged most inside of the ring portions 34U, 34V, and 34W. The ring portion 34U has a diameter that is similar to or slightly smaller than a radial inside diameter defined by the tooth portions 24U. All the tooth portions 24U, 24V, and 24W provide radial inside magnetic poles that define an inner rotor space having a radial inside diameter capable of accommodating an inner rotor. In addition, the ring portions 34V and 34W are smaller in diameter than the ring portion 34U. Therefore, a connecting ring provided by the ring portions 34U, 34V, and 34W is arranged inwardly protruded into the radial inside diameter, but is located on an axial outside of the inner rotor space. The holder portions 36V are fitted on an inner surface of the ring portion 34U. The holder portions 36W are fitted on an inner surface of the ring portion 34V. As a result, the plurality of ring portions 34U, 34V, and 34W are supported each other in a radially separated manner. That is, the holder portions 36V and 36W are located between radially adjacent two of the ring portions 34U, 34V, and 34W, and work as protruded spacers for supporting the ring portions 34U, 34V, and 34W each other in a radially separated manner.

In the assembled form of the plurality of ring portions 34U, 34V, and 34W in a coaxial manner, the recess portions 38U and 38V avoid collision between the ring portions 34U and 34V and the windings 16V and 16W. The jumper portions 28V are arranged and located to pass through the recess portion 38U formed on the ring portion 34U. The jumper portions 28W are arranged and located to pass through the recess portion 38U formed on the ring portion 34U and the recess portion 38V formed on the ring portion 34V. Therefore, the jumper portions 28V and 28W are arranged to pass through the recess portions 38U and 38V formed on the ring portions 34U and 34V arranged outside thereof.

The stator 10 and a rotor provide an inner rotor type brushless motor. In this type of the brushless motor, the stator 10 generates a rotating magnetic field. Then, the rotor rotates in accordance with the rotating magnetic field. The stator 10 provides 8 magnetic poles and 12 slots.

Hereinafter, a method of manufacturing the stator 10 and the brushless motor are described.

The method includes a forming step of a U-phase-subassembly 42U that includes the plurality of core members 14U and the insulator 18U as shown in FIG. 2A. In the forming step, the core members 14U and the insulator portions 32U of the insulator 18U are assembled or formed in an integral fashion. Similarly, the method includes a forming step of a V-phase-subassembly 42V that includes the plurality of core members 14V and the insulator 18V as shown in FIG. 2B. In the forming step, the core members 14V and the insulator portions 32V of the insulator 18V are assembled or formed in an integral fashion. Further, the method includes a forming step of a W-phase-subassembly 42W that includes the plurality of core members 14W and the insulator 18W as shown in FIG. 2C. In the forming step, the core members 14W and the insulator portions 32V of the insulator 18W are assembled or formed in an integral fashion. As described above, the method includes a subassembly forming step which provides subassemblies 42U, 42V, and 42W of all phases.

The method further includes a winding step in which each one of the windings 16U, 16V, and 16W is wound on corresponding one of the subassemblies 42U, 42V, and 42W. The winding step includes a plurality of coil forming steps in which a conductive wire is wound on the tooth portions 24U, 24V, and 24W via the insulator portions 32U, 32V, and 32W to form the coil portions 26U, 26V, and 26W. <<<The winding step further includes a plurality of jumper forming steps performed between the coil forming steps. In the jumper forming steps the jumper portions 28U, 28V, and 28W are wound on the ring portions 34U, 34V, and 34W.

The coil forming steps include U-phase-coil forming steps for forming the U-phase-stator section 12U in which the coil portions 26U are formed on the U-phase subassembly 42U as shown in FIG. 2A. The U-phase-coil forming steps are performed by winding the winding 16U, i.e., a conductive wire, on the tooth portions 24U of the U-phase subassembly 42U from a radial outside of the tooth portions 24U by using a flyer winding machine. Similarly, the coil forming steps include V-phase-coil forming steps for forming the V-phase-stator section 12V in which the coil portions 26V are formed on the V-phase subassembly 42V as shown in FIG. 2B. The V-phase-coil forming steps are performed by winding the winding 16V, i.e., a conductive wire, on the tooth portions 24V of the V-phase subassembly 42V from a radial outside of the tooth portions 24V by using a flyer winding machine. Further, the coil forming steps include W-phase-coil forming steps for forming the W-phase-stator section 12W in which the coil portions 26W are formed on the W-phase subassembly 42W as shown in FIG. 2C. The W-phase-coil forming steps are performed by winding the winding 16W, i.e., a conductive wire, on the tooth portions 24W of the W-phase subassembly 42W from a radial outside of the tooth portions 24W by using a flyer winding machine.

While performing the winding step, the plurality of jumper forming steps are performed between the coil forming steps to arrange the jumper portions 28U on a radial outside surface of the ring portion 34U as shown in FIG. 2A. In the jumper forming steps, the jumper portions 28U are placed on the holder portions 36U in order to support the jumper portions 28U from the other axial side of the ring portion 34U. Similarly, while performing the winding step, the plurality of jumper forming steps are performed between the coil forming steps to arrange the jumper portions 28V on a radial outside surface of the ring portion 34V as shown in FIG. 2B. In the jumper forming steps, the jumper portions 28V are placed on the holder portions 36V in order to support the jumper portions 28V from the one axial side of the ring portion 34V. Further, while performing the winding step, the plurality of jumper forming steps are performed between the coil forming steps to arrange the jumper portions 28W on a radial outside surface of the ring portion 34W as shown in FIG. 2C. In the jumper forming steps, the jumper portions 28W are placed on the holder portions 36W in order to support the jumper portions 28W from the one axial side of the ring portion 34W.

While performing the winding step, the terminal portions 30U are formed to be extended from a pair of the tooth portions 24U to an axial one side direction, i.e., the direction shown by the arrow Z1, of the stator 10. Similarly, while performing the winding step, the terminal portions 30V are formed to be extended from a pair of the tooth portions 24V to the axial one side direction of the stator 10. Further, while performing the winding step, the terminal portions 30W are formed to be extended from a pair of the tooth portions 24W to the axial one side direction of the stator 10. As described above, the method includes a stator section forming step which provides a set of stator sections, such as stator sections for three phases, e.g., the U-phase-stator section 12U, the V-phase-stator section 12V, and the W-phase-stator section 12W.

The method further includes an assembling step in which the U-phase-stator section 12U, the V-phase-stator section 12V, and the W-phase-stator section 12W are assembled to form the stator 10. The stator sections 12U, 12V, and 12W are assembled by axially stacking the stator sections 12U, 12V, and 12W while meshing the yoke portions 22U, 22V, and 22W, and relatively positioning the tooth portions 24U, 24V, and 24W in predetermined circumferential positions. In the assembling step, the stator sections 12U, 12V, and 12W may be assembled by meshing two stator sections first, and then, by meshing remaining one stator section onto the assembled two stator sections. The stator sections 12U, 12V, and 12W may be assembled simultaneously.

Figure 3A:
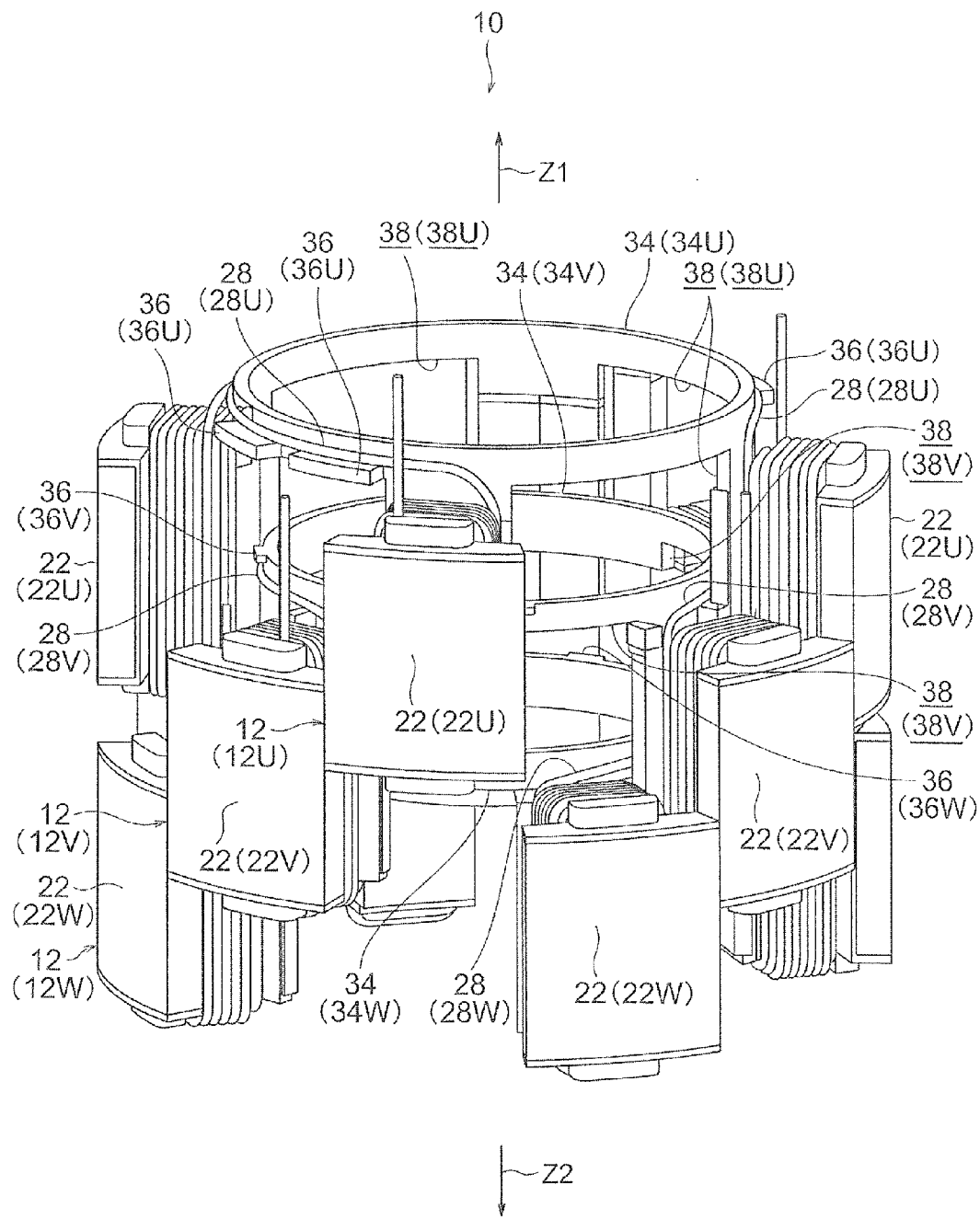
FIG. 3A is a perspective view of a stator at an earlier step of assembling process of a plurality of stator sections shown in FIG. 1.
Figure 3B:
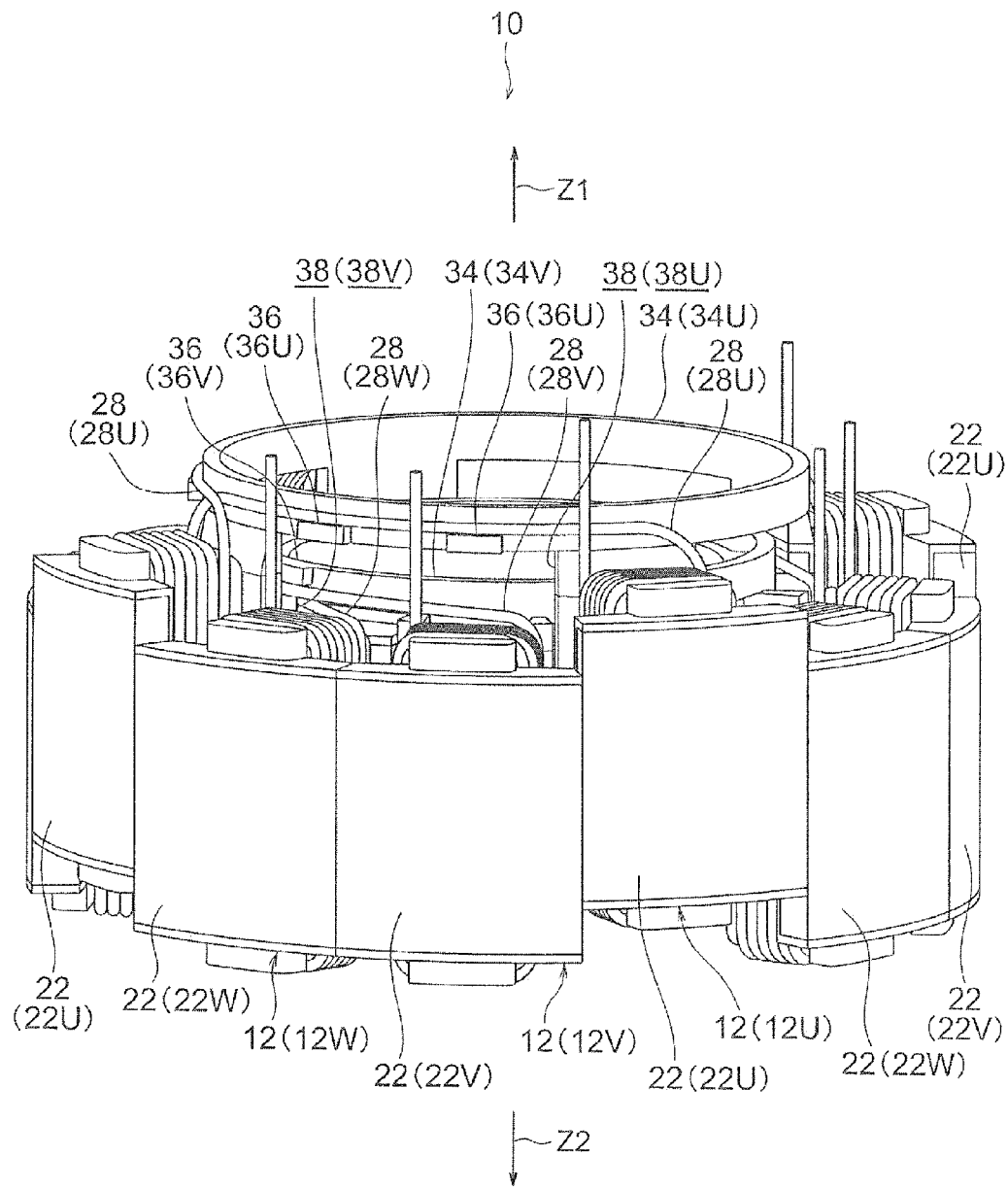
FIG. 3B is a perspective view of a stator at a later step of assembling process of a plurality of stator sections shown in FIG. 1.

In the assembling step, the stator sections 12U, 12V, and 12W are assembled as shown in FIGS. 3A and 3B. The V-phase-stator section 12V and the W-phase-stator section 12W may be axially stacked while the V-phase-stator section 12V is shifted a predetermined angle in a circumferential direction with respect to the W-phase-stator section 12W. For example, the V-phase-stator section 12V is placed on the one axial side of the W-phase-stator section 12W where the ring portion 34W is formed, the side where the arrow Z1 is illustrated. The V-phase-stator section 12V is shifted in a one circumferential direction to place the yoke portions 22V just next to the yoke portions 22W so as to come in contact with each other in a circumferential direction. Then, the V-phase-stator section 12V and the W-phase-stator section 12W are axially stacked and meshed to place the yoke portions 22V and 22W next to each other. For example, the V-phase-stator section 12V is assembled onto the W-phase-stator section 12W along the direction shown by the arrow Z2. The U-phase-stator section 12U and the V-phase-stator section 12V are axially stacked while the U-phase-stator section 12U is shifted a predetermined angle in a circumferential direction with respect to the V-phase-stator section 12V. For example, the U-phase-stator section 12U is placed on the one axial side of the V-phase-stator section 12V where the ring portion 34V is formed, the side where the arrow Z1 is illustrated. The U-phase-stator section 12U is shifted in a one circumferential direction to place the yoke portions 22U just next to the yoke portions 22V so as to come in contact with each other in a circumferential direction. In a case that the V-phase-stator section 12V and the W-phase-stator section 12W are already assembled, the U-phase-stator section 12U is shifted to place the yoke portions 22U respectively between the yoke portions 22V and 22W. Then, the U-phase-stator section 12U and the V-phase-stator section 12V are axially stacked and meshed to place the yoke portions 22U and 22V next to each other. For example, the U-phase-stator section 12U is assembled onto the V-phase-stator section 12V along the direction shown by the arrow Z2.

In the assembling step, the stator sections 12U, 12V, and 12W are assembled by meshing and fitting each one of the yoke portions 22U, 22V, and 22W between a pair of the other yoke portions placed on both sides of the one to come in contact with each other. In the assembling step, the stator sections 12U, 12V, and 12W are assembled by fitting the holder portions 36V on the radial inside surface of the ring portion 34U, and by fitting the holder portions 36W on the radial inside surface of the ring portion 34V. As a result, the plurality of ring portions 34U, 34V, and 34W are held in a radially separated manner by the holder portions 36V and 36W, which are formed as protruded portions on inwardly located ring portions 34V and 34W.

Figure 5:
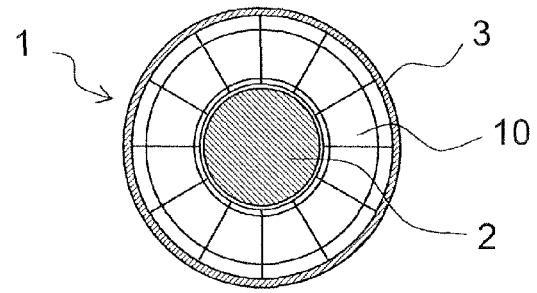
FIG. 5 is a cross sectional view of an inner rotor type brushless motor according to the embodiment.

In the assembling step, the jumper portions 28V are placed to pass through an inside of the recess portion 38U formed on the ring portion 34U. The jumper portions 28W are placed to pass through an inside of the recess portion 38U formed on the ring portion 34U and an inside the recess portion 38V formed on the ring portion 34V. As described above, the method includes the assembling step which forms the stator 10 by assembling the stator sections 12U, 12V, and 12W as described above. The assembling step may also be referred to as a stator forming step. The terminal portions 30U, 30V, and 30W are connected to connecting members such as bus bars to connect the windings 16U, 16V, and 16W into the known three-phase connections. The stator 10 is manufactured by the above described method. Then, an inner rotor type brushless motor 1 is manufactured by assembling an inner rotor 2 and the stator 10 in a cylindrical housing 3 as shown in FIG. 5. The stator 10 is fixed in a cylindrical housing 2. An inner rotor 2 is also assembled in a radial inside space defined by the radial inside distal end of the tooth portions 24U, 24V, and 24W in a rotatable manner.

Hereinafter, functions and advantages of the embodiment are described in detail.

In the following description, if it is not necessary to identify the phases, such as the U phase, the V phase, and the W phase, the symbols U, V, and W are removed from the reference symbols.

According to the stator 10, the yoke 40 is formed by a plurality of yoke portions 22 which are provided by dividing the yoke 40 along a circumferential direction. This allows that the stator 10 to be divided into a plurality of subassemblies 42, e.g., for respective phases U, V, and W. Each one of the subassemblies 42 only has one third of the tooth portions 24 of the stator 10. As a result, it is possible to provide sufficient spaces on both sides of the tooth portions 24 on each subassembly 42. Therefore, even if the stator 10 is the one that is used for the inner rotor type brushless motor in which the plurality of tooth portions 24 protrude inwardly from the yoke 40, it is possible to wind the windings 16 on the tooth portions 24 from the radial outside of the tooth portions 24 by using a winding machine. For example, in the case of U-phase subassembly 42U, one of the tooth portions 24U is sufficiently distanced from the other tooth portions 24U. On both sides of the tooth portion 24U, there are sufficient spaces. Each side space corresponds to two tooth portions 24V and 24W.

Figure 6:
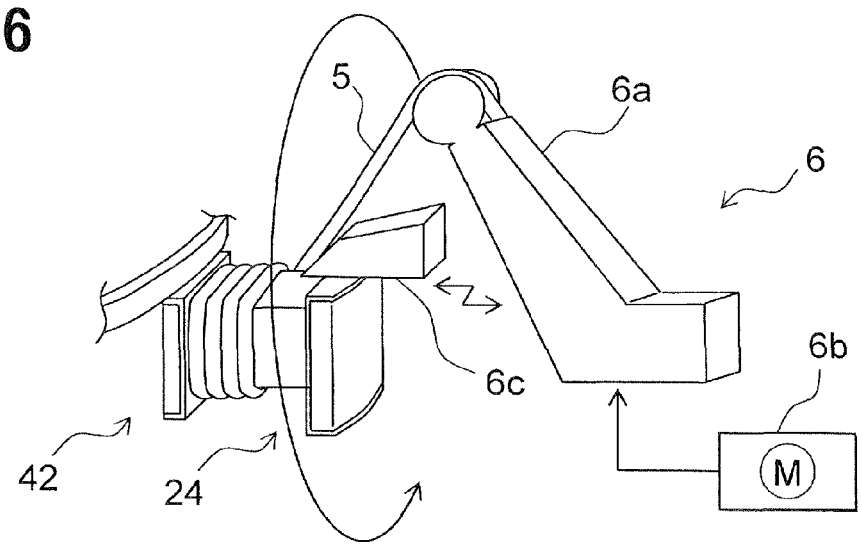
FIG. 6 is a perspective view of a flyer winding machine according to the embodiment.

According to the structure of each subassembly 42, it is possible to use the flyer winding machine. For example, a conductive wire 5 for the winding 16 can be wound on one of the tooth portions 24 from a radial outside of the subassembly 42, i.e., from a radial outside where the yoke portions 22 are placed, by using a flyer winding machine 6 as shown in FIG. 6. The flyer winding machine 6 feeds the conductive wire 5 from a distal end of a flyer 6a. The flyer 6a is driven to rotate around the tooth portion 24 along a circular path by a driving mechanism 6b. The flyer winding machine 6 further includes a variable former 6c which forms a shape of the conductive wire 5 wound on the tooth portions 24. The variable former 6c is also driven by the driving mechanism 6b in a reciprocating manner along the axial direction of the tooth portions 24.

Figure 7:
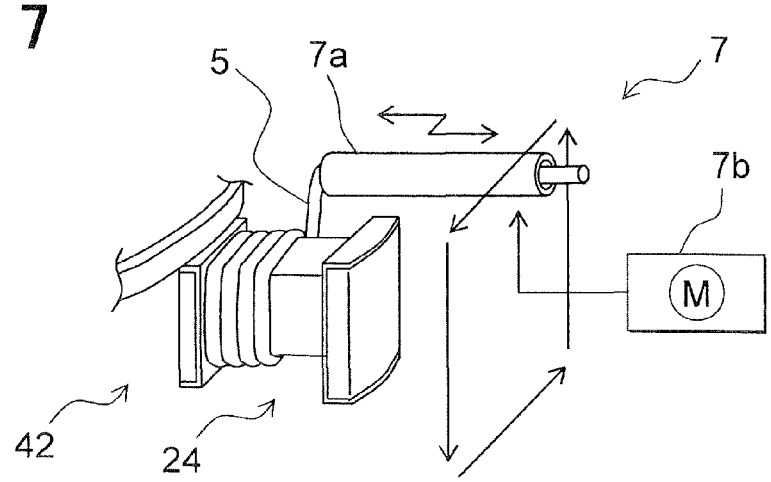
FIG. 7 is a perspective view of a nozzle winding machine according to the embodiment.

Alternatively, it is also possible to use the nozzle winding machine 7 as shown in FIG. 7. The nozzle winding machine 7 feeds the conductive wire 5 from a distal end of a nozzle 7a. The distal end of the nozzle 7a is always kept very close to a radial outside surface of the tooth portion during winding the coil portions 26. The nozzle portion 7a is driven to rotate around the tooth portion 24 along a rectangular path corresponding to a cross section of the tooth portions 24 by a driving mechanism 7b. The nozzle portion 7a is also driven in a reciprocating manner by the driving mechanism 7b.

After winding the windings 16 on respective subassemblies 42, the subassemblies 42 are assembled to form the stator 10. Therefore, it is possible to fill the spaces on both sides of the tooth portions 24 with the other tooth portions. For example, the space between the tooth portions 24U is filled with the tooth portions 24V and 24W. As a result, it is possible to increase the space factor of the winding 16, i.e., a ratio of the windings 16 in the space formed between the tooth portions 24. In other words, it is possible to make the stator 10 small. If the yoke 40 is not divided, it is necessary to keep sufficient spaces between the tooth portions to allow the nozzle of the nozzle winding machine to enter and to rotate around the tooth portion, and it is not avoidable to lower the space factor.

The yoke 40 is divided into the plurality of yoke portions 22 along the circumferential direction. Therefore, it is possible to make the stator 10 small in the axial direction compare to a case in which the yoke 40 is divided along the axial direction.

Further, since each subassembly 42 only has one third of tooth portions 24 on the stator 10, each one of the tooth portions 24 is independently protruded in a radial outside direction from respective one of the ring portions 34. For example, in the illustrated subassembly 42, the tooth portions 24 are distanced 90 degrees interval each other. Therefore, all tooth portions 24 are completely open in all radial direction thereof. In the form of each subassembly 42, each one of the tooth portions 24 is sufficiently distanced from the other tooth portions 24 on the same subassembly 42, and has sufficiently large open space on both sides thereof. In addition, especially in the illustrated embodiment, no other tooth portions 24 formed on the same subassembly 42 is located on a radial outside area of one of the tooth portions 24. According to the arrangement of the subassembly 42, it is possible to use the flyer winding machine that is faster in winding speed compare to the nozzle winding machine. In a case of using the flyer winding machine, it is possible to make the winding step faster, and it is possible to manufacture the stator 10 in low cost by decreasing the number of winding machines.

The ring portions 34U and 34V define the recess portions 38U and 38V in which the jumper portion 28V and 28W are located. Therefore, since interference with the ring portions 34U and 34V and the jumper portions 28V and 28W is avoidable, it is possible to reduce length of the jumper portions 28V and 28W. Thereby, it is possible to make the stator 10 smaller, and to manufacture the stator 10 in lower cost.

Each one of the ring portions 34 has the holder portions 36 to hold the jumper portions 28 arranged on itself. Therefore, when forming the stator 10 by assembling the plurality of stator sections 12, it is possible to hold the jumper portions 28 on the ring portions 34 by the holder portions 36. Therefore, it is possible to improve workability at the time of assembling the plurality of stator sections 12. In addition, after assembling the stator 10 into the brushless motor, the jumper portions 28 are held on the ring portions 34 by the holder portions 36. Therefore, it is possible to prevent the jumper portions 28 from vibrating, and to reduce noise and malfunctions.

The plurality of ring portions 34 can be held in a radially separated manner by the holder portions 36 which are formed as protruded portions. Thereby, it is possible to form and provide spaces for arranging the jumper portions 28 between the ring portions 34, and to prevent the ring portions 34 from vibrating. In addition, it is possible to improve workability at the time of assembling the ring portions 34 compare to a case where the ring portions 34 are fitted each other over entire circumferential length.

The yoke portions 22 are integrally formed with the tooth portions 24. The core may be formed in a two-piece structure which includes a plurality of tooth portions connected at distal ends via a thin plate shaped bridging portions, and a yoke portion placed to connect base ends of the tooth portions. According to the embodiment, it is possible to reduce magnetic loss at junctions between the yoke and the tooth portions in the above mentioned two piece structure. That is, the two piece structure may have magnetic loss at three locations in a magnetic path. Magnetic loss may be generated at the bridging portion between the distal ends of adjacent pair of tooth portions. Magnetic loss may be generated at a connected portion between the base end of one tooth portion of the pair of the tooth portions and the yoke. Magnetic less may also be generated at a connected portion between the base end of the other one tooth portion of the pair of the tooth portions and the yoke. Contrary, in the stator 10 of this embodiment, since a magnetic loss may be generated only at one location that is a connection part between a pair of adjacent two of the yoke portions 22, it is possible to reduce magnetic loss. Thereby, it is possible to make the stator 10 smaller, and lighter in weight.

Since the coil portions 26 are connected by the jumper portions 28, it is possible to eliminate or reduce an amount of connecting member such as a number of bus bars. Therefore, it is possible to reduce an amount of components or number of components. This may contribute to reduce cost.

Since the jumper portions 28 can be wound on the ring portions 34, it is possible to increase a winding speed of the windings 16. Also, it is possible to eliminate a forming step for forming the jumper portions 28 into a desired shape after winding the windings 16. Therefore, it is possible to manufacture the stator 10 low cost.

In addition, since the brushless motor of this embodiment includes the stator 10, it is possible to provide a small and low cost brushless motor.

According to the manufacturing method of the stator 10 in this embodiment, the subassemblies 42 are formed for U, V, and W phases, then, winding machine is used to wind the windings 16 on the tooth portions 24 on the subassemblies 42, respectively. Therefore, it is possible to reduce spaces between the tooth portions 24. Therefore, it is possible to increase the space factor of the windings 16 on the stator 10, and to decrease the size of the stator 10. Especially, in this embodiment, it is possible to eliminate spaces between the tooth portions 24.

In this embodiment, the windings 16 are wound on the tooth portions 24 by using a flyer winding machine.

Hereinafter, modifications of the embodiment are described.

In the illustrated embodiment, the brushless motor is formed in a configuration of 8 magnetic poles and 12 slots. Alternatively, the number of magnetic poles and the number of slots may be changed. The brushless motor may have other combination of the number of magnetic poles and the number of slots.

Figure 4:
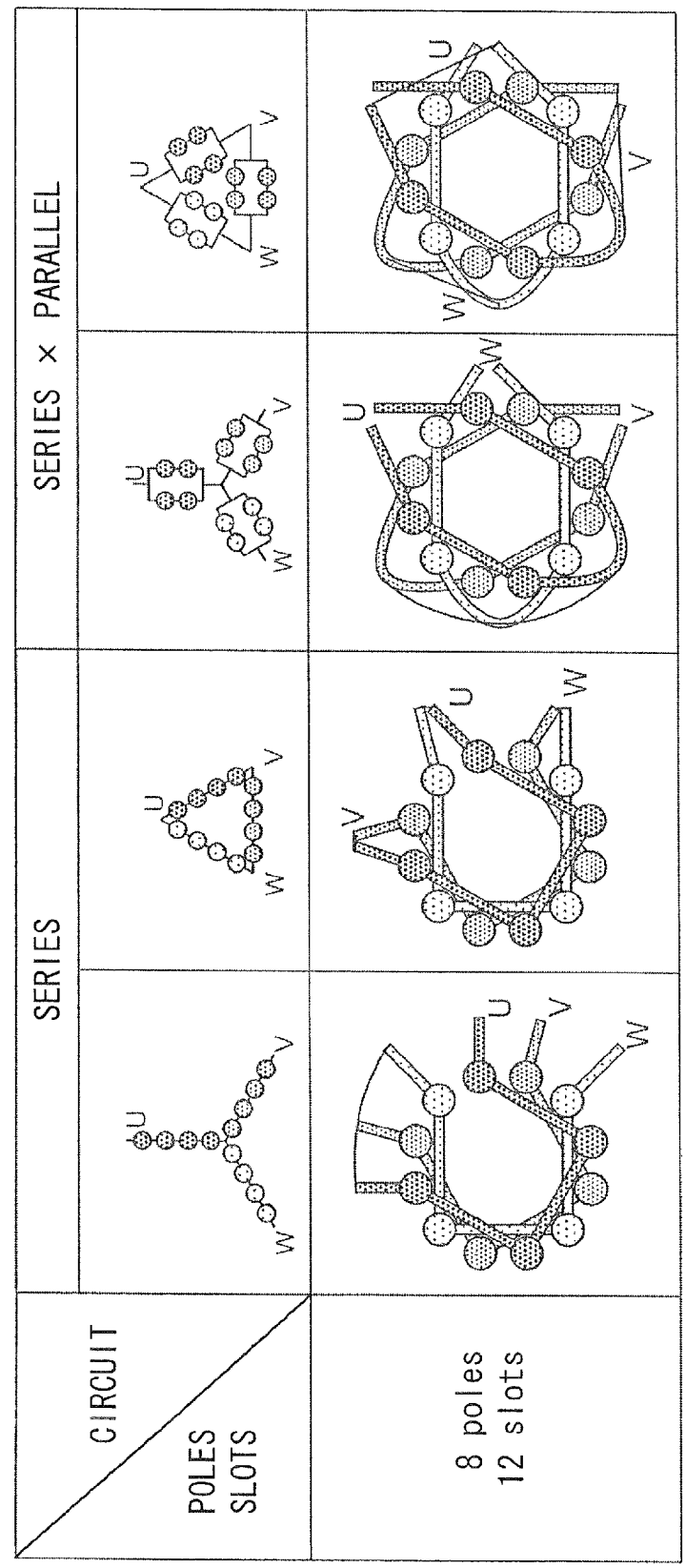
FIG. 4 is a diagram showing a plurality of connections for windings which can be applied to the present invention.

The windings 16U, 16V, and 16W may be connected in any connection forms of the multi-phase connection. For example, the windings 16U, 16V, and 16W may be connected in a star connection form, or a delta connection form as shown in FIG. 4. In one of the windings 16, the coil portions 26 may be connected in series. Alternatively, in one of the windings 16, a pair of the coil portions 26 may be connected in series, and the pairs may be connected in parallel.

In the embodiment, the holder portions 36 work as a wire holder for holding the jumper portions 28, and as a protruded spacer for maintaining the ring portions 34 in a radially separated fashion. Alternatively, the holder portions 36 may includes wire holders and spacers independently. For example, in addition to the dual purpose holder portions 36, the ring portion 34V may have an outwardly protruding spacer capable of being fitted on the inside surface of the ring portion 34U and an inwardly protruding spacer capable of being fitted on the outside surface of the ring portion 34W.

Alternatively, the holder portions 36 may be formed merely as the spacers. Alternatively, the holder portions 36 may be formed merely as the wire holders. In the illustrated embodiment, the holder portions 36 are formed on all of the ring portions 34. Instead of the above structure, it is possible to eliminate the holder portions 36W from the ring portions 34W, and to form inwardly protruding holder portions, on the ring portion 34V, capable of being fitted on the outside surface of the ring portion 34W. Alternatively, a part of the holder portions 36 may be eliminated. For example, the holder portions 36U may be removed from the ring portions 34U.

In the illustrated embodiment, the ring portions 34 are provided on only one side of the plurality of insulator portions 32. Alternatively, the ring portions may be provided on the other side of the plurality of insulator portions 32. Alternatively, the ring portions may be provided on both sides of the plurality of insulator portions 32. The ring portions 34 may be formed in a shape other than a circular ring illustrated in the drawings. For example, the ring portions 34 may be formed in a polygonal shape, such as a rectangular cylindrical shape. The ring portions 34 may be assembled in an arrangement other than the coaxial arrangement illustrated in the drawings. For example, the ring portions 34 may be assembled in a decentering manner with respect to the center defined by the core members 14. The holder portions 36 may be formed in an arc shape or a flange shape extending along a circumferential direction of the ring portions 34.

In the above embodiments, the connecting portion is provided by the ring portions 34. However, the connecting portion may not be formed in a completely continuous shape along a circumferential direction. For example, the connecting portions may be provided by a C-shaped member, which extends along the ring portion 34 but has a recessed discontinuity.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A stator for a rotary electric machine comprising:
   a core having a ring shaped yoke and a plurality of tooth portions protruding inwardly from the yoke, the core including a plurality of core members, each of the core members including a yoke portion which provides a part of the yoke, and the tooth portion integrally formed with the yoke portion;
   a plurality of windings having a plurality of coil portions wound on the tooth portions, the windings providing a plurality of phase windings; and
   a plurality of insulators provided for phases of the rotary electric machine respectively, each of the insulators having a plurality of insulator portions disposed between the tooth portions and the coil portions, and a connecting portion which connects the insulator portions and the core members for the same phase, wherein
   the yoke portions and the coil portions are arranged on a radial outside of the connecting portion which connects the insulator portions and the core members for the same phase.

2. The stator in claim 1, wherein the connecting portion and the insulator portions in one of the phases are formed to hold the tooth portions in an outwardly protruding manner with respect to the connecting portion.

3. The stator in claim 1, wherein each of the connecting portions is formed in a ring shape.

4. The stator in claim 3, wherein the connecting portions are arranged on the same axis of the yoke.

5. The stator in claim 3, wherein each of the windings further includes a plurality of jumper portions which connect the plurality of coil portions and are arranged on the ring portions on the same phase, and wherein the ring portions are coaxially arranged with each other, and wherein the ring portions other than the ring portion arranged most inside have recess portions.

6. The stator in claim 5, wherein the jumper portions are arranged to pass through the recess portions formed on the ring portions arranged outside thereof.

7. The stator in claim 3, wherein each of the windings further includes a plurality of jumper portions which connect the plurality of coil portions and are arranged on the ring portions on the same phase, and wherein each of the ring portions includes a holder portion holding the jumper portion arranged on the ring portion.

8. The stator in claim 3, wherein the ring portions are coaxially arranged with each other, and wherein at least one of the ring portions includes a spacer portion which is disposed between radially adjacent ring portions and keeps the ring portions in a radially distanced manner.

9. A brushless motor comprising: the stator claimed in claim 1, and a rotor rotatable by a rotating magnetic field generated by the stator.

10. A method of manufacturing a stator for a rotary electric machine, the stator including
    a core having a ring shaped yoke and a plurality of tooth portions protruding inwardly from the yoke, the core including a plurality of core members, each of the core members including a yoke portion which provides a part of the yoke, and the tooth portion integrally formed with the yoke portion,
    a plurality of windings having a plurality of coil portions wound on the tooth portions, the windings providing a plurality of phase windings, and
    a plurality of insulators provided for phases of the rotary electric machine respectively, each of the insulators having a plurality of insulator portions disposed between the tooth portions and the coil portions, and a connecting portion which connects the insulator portions for the same phase, the method comprising:
    forming subassemblies for the phases by assembling or integrally forming the core members and the insulator portions;
    forming stator sections for the phases by winding the winding on the tooth portions placed on the subassembly from a radial outside of the subassembly by using a winding machine; and
    forming the stator by assembling the stator sections.

11. The stator in claim 1, wherein
    the insulator is made of resin, and
    the connecting portion is placed on a radial inside of the plurality of insulator portions which hold the core members to place the yoke portions on a radial outside of the connecting portion, the insulator portions, the coil portions and the tooth portions, and
    the tooth portions provide radial inside magnetic poles that define an inner rotor space.

* * * * *